May 4, 1965  C. O. SCHUMANN  3,182,262
DENSIOMETER RADIATION MONITORING DEVICE
Filed Sept. 7, 1962  2 Sheets-Sheet 1

INVENTOR.
CHARLIE O. SCHUMANN
BY
Alfred W. Barber
ATTORNEY

May 4, 1965  C. O. SCHUMANN  3,182,262
DENSIOMETER RADIATION MONITORING DEVICE
Filed Sept. 7, 1962  2 Sheets-Sheet 2

INVENTOR.
BY CHARLIE O. SCHUMANN
Alfred W. Barber
ATTORNEY 3,182,262
DENSIOMETER RADIATION MONITORING DEVICE
Charlie O. Schumann, Huntington, N.Y., assignor to Ramcor Incorporated, Hicksville, N.Y., a corporation of New York
Filed Sept. 7, 1962, Ser. No. 222,102
1 Claim. (Cl. 325—363)

The present invention concerns novel methods of and means for detecting and measuring radio frequency energy existing in the vicinity of high power transmitters and the like.

Laser and maser devices have been developed rapidly to a point where highly concentrated fields of energy can be produced. Microwave devices such as radar are in use producing large amounts of field power. The dielectric heating and other effects of high frequency field energy is harmful to human beings when produced at energy levels above a certain point. It is presently accepted that fields above 10 mw./cm.$^2$ are unsafe for human beings. While previously means for measuring such fields have been complex, cumbersome and expensive, the device which is provided in accordance with the present invention is simple, small, easy to use and inexpensive by comparison.

In accordance with the present invention a suitable antenna feeding a thermistor in a bridge circuit yields an indication on a meter connected across the bridge. The antenna is designed to intercept a predetermined field area so that for a given RF field intensity, a predetermined current is caused to flow through the thermistor. The bridge is designed to balance with a calibrating battery current flowing through the thermistor giving it an initial temperature and hence an initial value of resistance. When RF current picked up on the antenna flows through the thermistor, its temperature is raised unbalancing the bridge. The indicating meter is calibrated to read field intensity in DB above and below a predetermined level. The zero level is usually chosen as 10 mw./cm.$^2$ the presently accepted safe field level. The indicating meter is additionally marked "SAFE" for fields below zero level and "DANGER" for fields above zero level.

The thermistor which is to be heated by current from the RF field is placed close to the antenna and in a coaxial line running from the antenna to the bridge circuits. Thus the RF current flows in a very short path close to the antenna and the line to the bridge carries no RF. For a complete hand-held device the line from the thermistor to the bridge may be a short section of pipe holding the antenna and indicator parts together as a unit. The device also lends itself to physical separation of the antenna-thermistor portion and the bridge-indicator portion with merely a flexible coaxial cable connecting the two. Since the cable carries only the D.C. bridge current, it may be quite long without affecting the accuracy of indication. Thus, the antenna (pick-up) may be located at a remote point where it is desired to monitor RF fields. The meter may be replaced by other circuits such as a relay closing an alarm circuit or an amplifier feeding the modulator of a transmitter, etc. since the basic response of the system may be utilized in any desired fashion.

By changing antennas a wide range of frequencies may be monitored. Each antenna is designed and proportioned to intercept substantially the same portion of the field, i.e. is designed to have substantially the same "height." An individual calibrating resistor is provided for each antenna to equalize the over all sensitivity of the device. In a typical embodiment of the present invention a form of loop antenna is used for 200–225 mc., 400–450 mc. and for microwave L band operation while various horn antennas are used for microwave C, S and X bands. Other coverage may be provided by using similar suitably proportioned antennas. Once the antenna has been chosen and calibrated by means of its compensating resistor it is only necessary to check batteries to be sure they are up to full voltage and to balance the bridge by varying a resistor in series with the battery. When the bridge is balanced in this manner, the thermistor has a predetermined resistance due to a predetermined calibrating current flowing therethru.

Accordingly the principal object of the present invention is to provide a simple, effective and convenient method of and means for measuring RF field densities especially at ultra-high and super-high frequencies.

Another object is to indicate these fields on a meter calibrated in DB above and below the presently accepted upper limit of safety of 10 mw./cm.$^2$.

Still another object is to provide a simple and effective method of and means for changing the frequency range of the device as by changing the antenna.

A further object is to provide a simple and effective method of and means for picking up a field to be monitored at one point and indicating it at a remote point.

These and other objects of the present invention will be apparent from the detailed description of the invention given below in connection with the various figures of the drawing.

Figure 1:
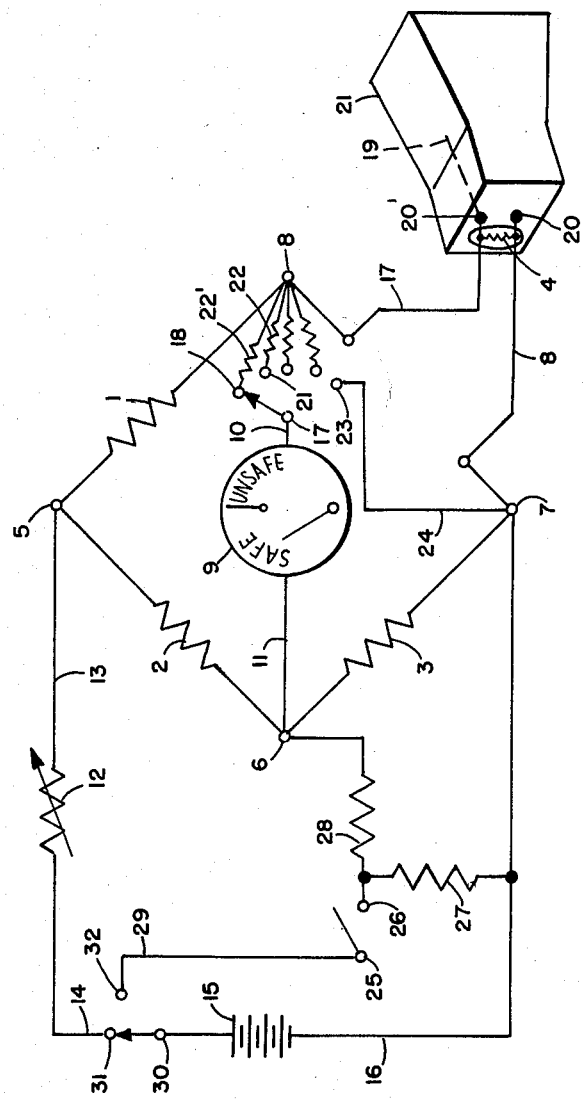
FIGURE 1 is a schematic circuit diagram of the preferred form of the present invention.

FIG. 1 shows the schematic circuit of the preferred form of the present invention. A bridge circuit is used having the three fixed resistors 1, 2 and 3 connected across terminals 20–5, 5–6 and 6–7 respectively. The fourth bridge arm is the thermistor 4 connected between terminals 7 and 8 by means of leads 8 and 17. Direct current input to the bridge is supplied from a suitable source such as battery 15 connected over lead 16 to terminal 7 and through on-off switch 30–31, zero setting variable resistor 12 and over lead 13 to the diagonal bridge terminal 5. The indicating meter 9 is connected across the opposite diagonal terminals 6 and 8 over leads 11 and 10 and through switch 17–18 (21 etc.). One of the antenna forms, a horn 21, is coupled across the thermistor 4 at terminals 20 and 20'. Terminal 20 is grounded on the horn while terminal 20' is connected to a coupling stub 19 which projects into the horn cavity. The horn is of such size and shape as to intercept a predetermined portion of an RF field in which it may be placed. The stub 19 is of such size and shunt capacity as to provide an impedance match with thermistor 4 at a predetermined calibrating temperature.

The bridge resistors 1, 2 and 3 are chosen so that the bridge will balance at a predetermined resistance value of the thermistor 4. At balance no current will flow in the indicating meter 9 and this condition is called "zero balancing." The thermistor is a device the resistance of which varies with its temperature. The resistance for balance is chosen to require a thermistor temperature greater than normal ambient temperatures in the environment in which the device is to be used. This elevated temperature is conveniently produced by passing current from battery 15 under the control of variable resistor 12 through the thermistor. Thus battery 15 provides current to the bridge permitting balance to be detected in the meter and current to preheat the thermistor. Thus, the bridge is balanced, with no RF field pick-up, by varying resistor 12 until the indicating meter reads zero indicating that thermistor 4 has been heated to its predetermined initial temperature.

Now, if an RF field is picked up by the horn antenna, the RF energy collected flows through thermistor 4 still further raising its temperature. This increase in temperature of thermistor 4 changes its resistance upsetting the bridge balance. The degree of resulting bridge unbalance is indicated by the unbalance current which flows in indicating meter 9. The device is calibrated by picking up a predetermined field in the horn antenna and choosing a value of calibrating resistance 22' (22 etc.) which gives a predetermined reading on meter 9. A different resistor may be provided for each antenna to standardize the calibration and these resistors 22', 22, etc. may be chosen by means of switch 17–18—21 etc. In the preferred form of the present invention a field of 10 mw./cm.$^2$ has been selected as the stand field and mid-scale on the meter the reading for this field. Since 10 mw./cm.$^2$ is currently regarded as the maximum field for human safety, the meter indicates safe fields below mid-scale and unsafe or dangerous fields above mid-scale.

Since the sensitivity of the bridge circuit depends on the battery voltage, a battery check is provided. This battery check is made by closing switch arm 30 to contact 32, closing switch 25–26 and closing switch arm 17 to contact 23. When this is done, battery 15 is loaded to a predetermined current over leads 29 and 16 by resistor 27 and the resulting loaded battery voltage is indicated by meter 9 which is calibrated as a voltmeter by series resistor 28 over leads 11, 10, and 24. If the battery voltage under these test conditions, shows a drop of more than a tolerable amount, the calibration of the device will be impaired and the battery should be replaced.

Figure 2:
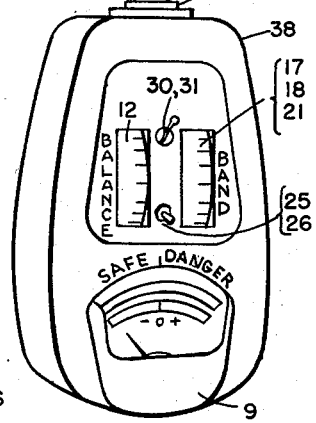
FIGURE 2 is an external view of a complete device in accordance with the present invention showing a typical short coupling to the pick-up antenna.

FIG. 2 shows a physical embodiment of the preferred form of the present invention. The horn antenna 21 includes a neck 33 carrying terminals 20-20' (not shown but provided by a conventional coaxial coupling). The thermistor 4 is contained in a cylindrical housing 35 also carrying an inner coaxial conductor (not shown) which is coupled to housing 38 at flange 37 by coupling 36. Housing 38 contains the bridge resistors 1, 2 and 3, battery 15, switches 17–18–21, 25–26, 30–31, balance resistor 12 and indicating meter 9 all numbered to correspond with FIG. 1. Meter 9 is provided with a scale having 0 at its center as described above a DB scale above and below 0 (not shown) and the markings "SAFE" on a green background and "DANGER" on a red background.

Figure 3:
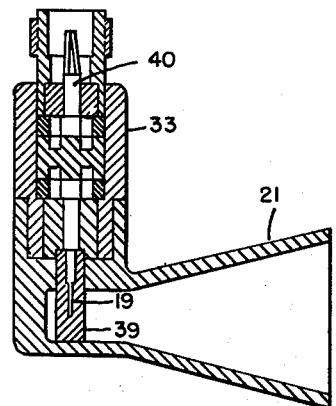
FIGURE 3 is a cross-sectional view of a typical horn antenna used in the present invention.

FIG. 3 shows a cross section of a typical horn antenna 21 with neck 33, carrying coaxial inner conductor 40 which is an extension of pick-up stub 19. The solid insulation 39 provides capacity between 19 and shell 33 to create the desired matching impedance.

Figure 4:
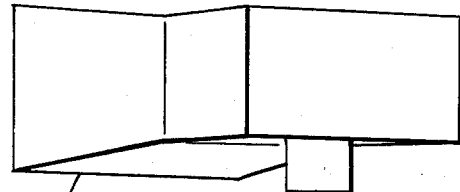
FIGURE 4 is a cross-sectional view of a typical loop type antenna used in one form of the present invention.
Figure 4:
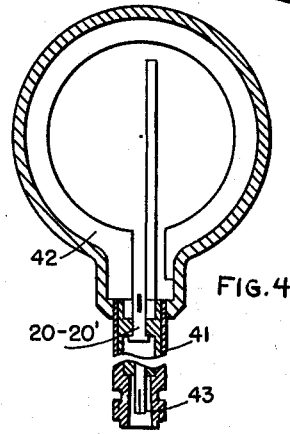

FIG. 4 shows another form of antenna suitable for use at somewhat lower frequencies than the horn. This antenna consists in a loop conductor 42 connected to terminals 20–20', shell 41 and inner conductor 43 of the coaxial fitting.

Figure 5:
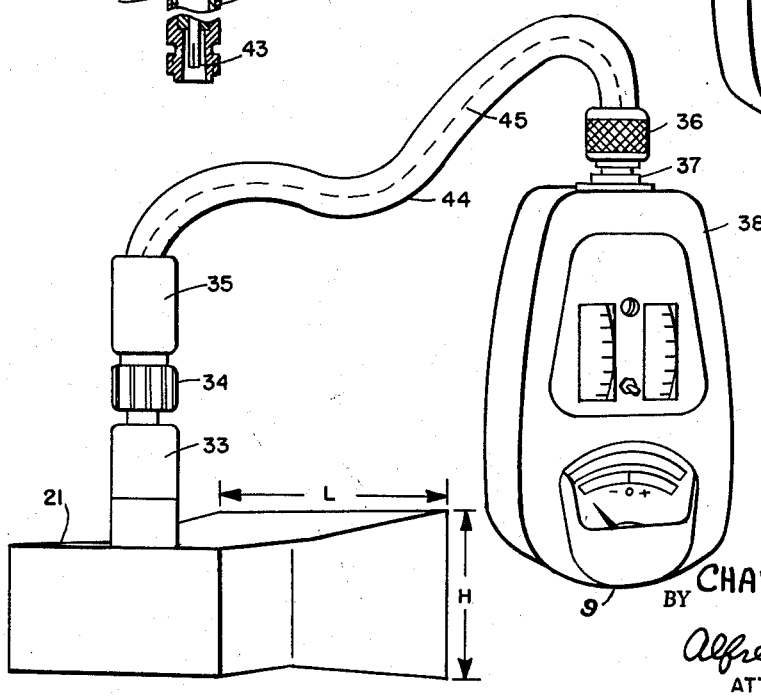
FIGURE 5 is an external view of a complete device in accordance with the present invention showing a modified form especially suitable for remote RF field monitoring.

FIG. 5 shows how the device of the present invention can be adapted for remote pick-up. The remote parts include the horn antenna 21 with neck 33 closely connected to the thermistor in its housing 35 by coupling nut 34. The D.C. bridge components, meter etc. in housing 38 are at the end of a flexible coaxial line 44–45 coupled by nut 36 at flange 37. Since this coaxial line 44–45 carries no RF current but only D.C. it may be of any convenient length without upsetting the accuracy of the system. Meter 9 may be replaced by a relay and alarm or other remote device where more than a simple meter indication is desired.

Figure 6:
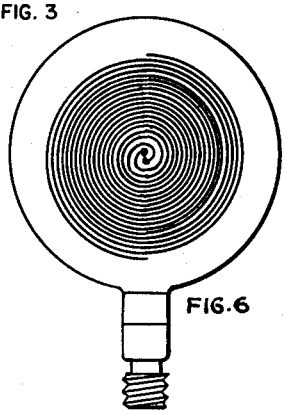
FIGURE 6 is a plan view of the spiral type antenna.

FIGURE 6 shows an antenna in the form of two concentric spiral conductors which has been found to be useful at the lower frequencies.

While the present device has been shown and described with a fixed gain meter indicator many modifications are possible since the sensitivity of the meter may be made variable so that the device can be used for mapping RF fields over a wide range of intensities. This may be done, for example, with a D.C. amplifier of variable gain. The meter may be replaced by a relay or an amplifier feeding a relay or an amplifier feeding other devices such as a radio transmitter or wire line for remote signaling or indication. These modifications have not been shown in the drawing since it will be obvious to one skilled in the art how they may be carried out. The term "densiometer" would seem to describe the device of the present invention.

While only one preferred form and one modification of the present invention have been shown and described, many modifications will be apparent to those skilled in the art and within the spirit and scope of the invention as set forth, in particular, in the appended claim.

What is claimed is:

In an RF field intensity measuring device, the combination of, a D.C. bridge circuit including three resistors forming three arms thereof and a pair of terminals for connection of a fourth arm, an adjustable source of direct current connected across one diagonal of said bridge, a direct current meter connected across the other diagonal of said bridge, a small antenna having predetermined pick-up properties and including an output coupler rigidly connected to said antenna, a rigidly cased thermistor including rigidly positioned input and output coupling means with said input connected to said antenna output coupler to form a short rigid connection between said antenna and said thermistor, and connecting means adapted to connect said output coupling means with said pair of bridge terminals whereby the circuit conditions between said antenna and said thermistor are rigid and predetermined and a non-critical direct current circuit exists between said thermistor output coupling means and the D.C. bridge circuit.

References Cited by the Examiner

UNITED STATES PATENTS

| | | | |
|---|---|---|---|
| 2,453,160 | 11/48 | Ringer | 325—67 |
| 2,497,094 | 2/50 | Moreno | 325—363 |
| 2,863,145 | 12/58 | Turner | 343—895 |
| 2,963,588 | 12/60 | Wilson | 325—364 |
| 3,056,925 | 10/62 | Borck et al. | 325—67 |
| 3,056,926 | 10/62 | Borck et al. | 325—67 |

OTHER REFERENCES

Mumford: "Some Technical Aspects of Microwave Radiation Hazards," Proc. I.R.E., February 1961, pp. 427–477.

Jaski: "Detecting Microwave-Radiation Hazards," Electronics World, vol. 65, No. 6, pp. 31–33 and 79.

DAVID G. REDINBAUGH, *Primary Examiner.*